Feb. 8, 1944.  L. A. EDERER  2,341,316
ANTISKID NET FOR VEHICLE TIRES AND THE LIKE
Filed Jan. 7, 1942
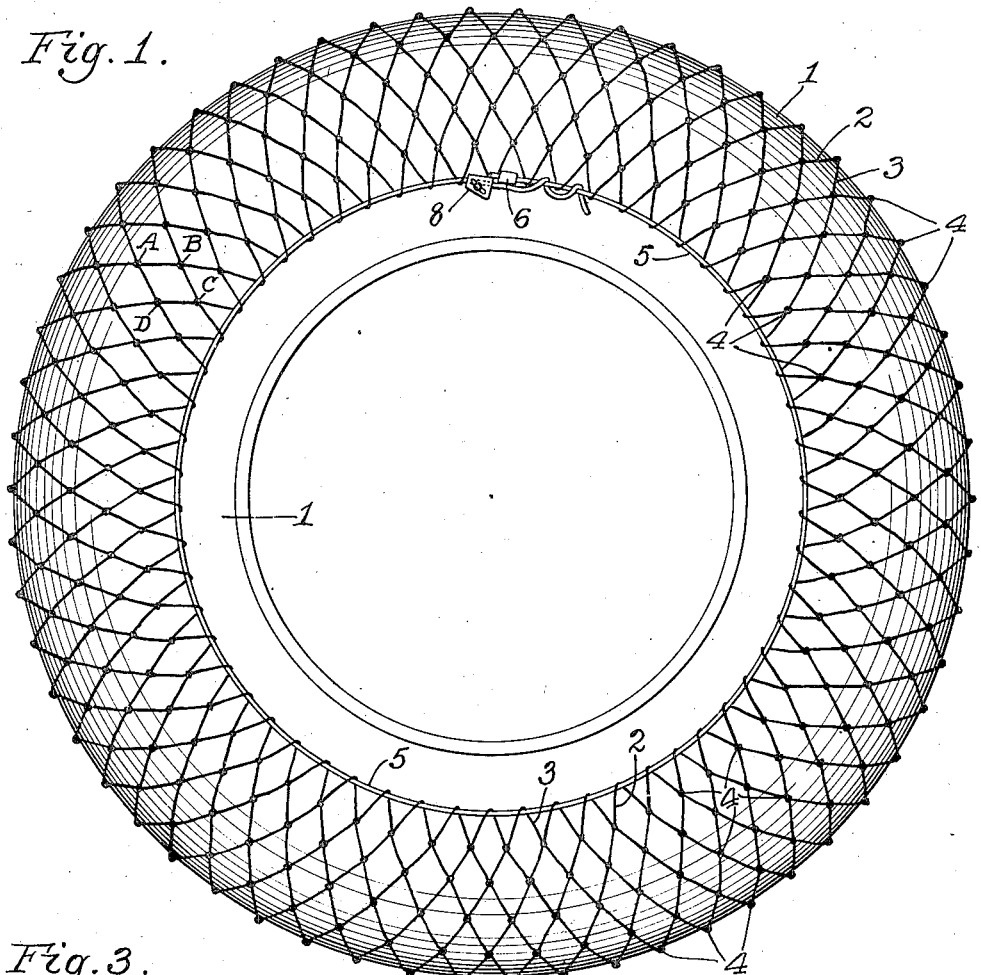
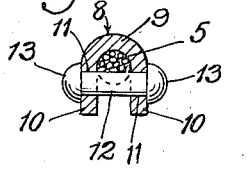
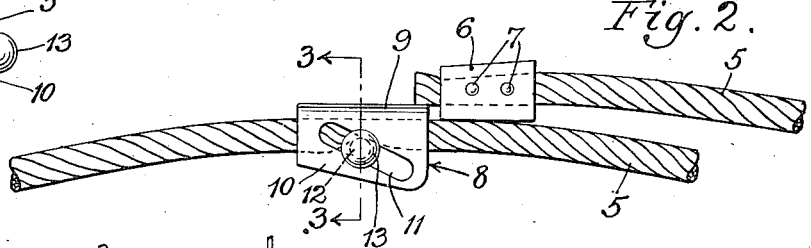
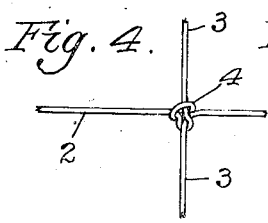 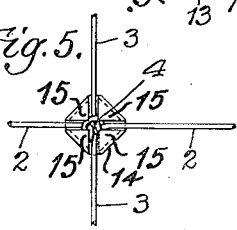
Inventor
Lothar A. Ederer
by Parker & Carter
Attorneys.

Patented Feb. 8, 1944

2,341,316

UNITED STATES PATENT OFFICE 2,341,316

ANTISKID NET FOR VEHICLE TIRES AND THE LIKE

Lothar A. Ederer, Chicago, Ill.

Application January 7, 1942, Serial No. 425,813

7 Claims. (Cl. 152—221)

My invention relates to improvements in antiskid nets for vehicle tires and the like and has for one object to provide a cheap, light, sufficiently durable and easily attached non-skid net which may, if desired, be used and then thrown away.

I propose to use as a substitute for the well-known non-skid chain which is heavy, expensive, of relatively short life and hard on the tire, a simple fabic netting netted preferably on a suitable netting machine, which ties the thread into a series of knots to form a net. Preferably cotton or similar twine will be used though it may be, if desired, coated with latex, rubber or any other suitable coating and the like. The netting machine will be set to tie the knots to form the net so that at each intersection between the twine, a relatively large knot will be formed as indicated in Figure 4 and if desired each individual knot may be armored or coated by an increased amount of rubber or latex applied after the netting operation is completed or even a metal sheath or housing for each knot may be provided.

My invention is illustrated more or less diagrammatically in the accompanying drawings, wherein—

Figure 1 is a side elevation of an automobile tire with my net in place;

Figure 2 is a side elevation on an enlarged scale showing the means for fastening the net on a tire;

Figure 3 is a section along the line 3—3 of Figure 2;

Figure 4 is a detail on an enlarged scale of one of the net knots;

Figure 5 is a view similar to Figure 4 showing the knot armored or reinforced by any suitable material calculated to increase the non-skid character of the equipment.

Like parts are indicated by like characters throughout the drawing and specification.

1 is an automobile tire. It is shown as encircled by a net comprising a series of cross threads or twine 2, 3. At every point where these threads or twines 2, 3, intersect is a knot 4. A tie cord 5 is passed through both edges of the net, one on each side of the tire. This tie cord is socketed at one end in a socket 6, being held there by rivets 7 or any other suitable means. The other end of the cord is thrust through a releasable socket 8 comprising a semi-cylindrical portion 9, terminating in side wings 10. Each wing has a diagonal slot 11. A pin 12 headed at both ends 13 is slidable in the slot 11. When the pin is at the extreme right hand position as shown in Figure 3, there is ample clearance for the cord 5 to be passed through the socket between the portion 9 and the pin 12. When tension on the cord 5 tends to move the pin 12 to the left, it also applies pressure to the cord so that a self locking coupling is provided. All the user has to do is to throw the net around the tire, thread the ends of the side cords through the releasable sockets and pull them tight and the net is in place on the tire.

Each knot 4 is the conventional, usual netting knot, the cords being twisted or netted, one around the other to make a knot of substantially greater bulk and thickness than the cords forming it. These knots provide the anti-friction surface to avoid skidding or give the automobile tire traction. Under some circumstances the twine from which the net is made will be of cotton or other suitable material without further treatment. If desired, the net may be tarred or treated with copper oleate to preserve it or the twine may be coated before netting with a preservative or with latex, vulcanized rubber or the like.

Further, if desired, each knot may be additionally reinforced as shown in Figure 5 by applying locally rubber or other suitable material or by enclosing each knot in a housing which can well be made of a square piece 14 of metal with each corner turned in. The smooth side of the metal will be against the tire and the turned in four corners 15 which serve mechanically to hold the metal on the knot will give a metal claw like contact with the road surface to increase traction.

It is a well-known fact that the user of an automobile has grown to be well pleased if his tire chain, costing ten or twelve dollars lasts five hundred miles. Usually conditions requiring tire chains are temporary and this five hundred miles actual use frequently amounts to a season's wear of the chains. Tire chains are noisy and on ice they tend to promote skidding because they set up vibration as each cross link comes between the tire and the road. It is not practical to have enough cross links to give constant road contact. The weight would be prohibitive so my solution of the problem increases the number of points of non-skid contact with the road, decreases weight, decreases noise. The fact that the cords are not particularly strong in proportion to the cross links of a tire chain is not of material consequence. The effect of increased traction is obtained not by the tension on the chain or cross links or on the net cords but by the presence between the tire and the road of a series of non-skid traction increasing points of increased pressure and road penetration. The purpose of the net is merely to insure that these points of increased traction effectiveness are always maintained in working contact with the face of the tire and always carried as the tire rotates into the road contact zone. This is true whether the net knots are left in their normal condition, are reinforced with rubber or the like or even carry metal reinforcing plates The metal reinforcing plates if used, will be relatively thin, so thin that they would crush flat if not supported by the knot contained within each plate. The necessity of this, of course, is that a stiff and rigid plate might easily tend to cut the tire but a thin plate such as I propose to use encircling the knot is not heavy enough to cut the tire but is of sufficient strength and bulk to increase road adhesion.

Such a net would be relatively inexpensive and might well be thrown away after one use. A relatively large proportion of the twine sections forming the knots might be cut or broken without effectively interfering with the operation of the device and a broken twine net section would never cause the noise caused by a broken chain cross link nor would it damage fenders and other automobile parts as is possible with the chain cross links.

One of the essential characteristics of a net as distinguished from other fabric construction is that the twine meshed together to form the net is joined with adjacent intersecting twine by a knot which does not slip so that after the netting machine has formed the net the net comprises a series of spaced knots, the distance between each knot and all the other knots measured in a direction parallel with the twine joining them, is fixed. Such a net of sufficiently loose or coarse mesh may be drawn around a tire without any special forming. The meshes of the net at the central part of the device may be substantially rectangular. As you go inward from the periphery toward the rim, the angles between the twine become more acute and all that is necessary to cause the net to grip the tire and fit it smoothly and snugly is to exert a circular tension on the cord in general parallelism with and concentric with the rim of the tire and this causes the entire net to hug the tire snugly without lumping or irregular displacement.

The use and operation of my invention are as follows:

The net is formed in a continuous annular band long enough to easily fit over the tire. The cord passes through each adjacent square of the net on each side and is long enough so that in the expanded position, the cord will slip over the tire. The operator having placed the net about the tire, will tighten up the inner cord first bringing the cord tightened to a circle about the diameter of the rim of the wheel. This will be easy to do because it is done against little if any net tension. The operator then will tighten the other outer cord around the tire against increased tension because he is now pulling the net snugly around the tire but because the cord is on the outside of the wheel, he can do it without difficulty. Instead of leaving the net loose on the wheel, as is the case with the conventional tire chain, the net will be drawn up snug on the wheel. Then as load is placed on the wheel and the wheel rotates, the net being flexible, will give with the tire on which it is snugly seated and as the tire rotates, successive knots will be brought into contact with the ground between the wheel and the road surface. There will always be a large number of knots and twine mesh sections pinched between the wheel and the road surface and the meshes and knots will exert their increased traction effect without appreciable bending or distortion of the tire surface and so without vehicle vibration.

It is a peculiar characteristic of the netting bands which I propose to use that a single size of band is entirely satisfactory for use on a wide range of tire sizes. The knots joining the intersecting cords or twines are all equi-distant, that is to say, the distance between any two knots along the twine joining them, is the same as the distance between any two other knots along the twine joining them in any part of the net. The net band at maximum longitudinal extension is equal in length, that is, circumference, around the tire to the total number of knots in any line parallel with the longitudinal axis of the net times the distance between each adjacent knot, that is to say, when the net is pulled out so that the meshes have substantially no transverse width the total length of the band is a maximum and each mesh then is infinitely thin in a direction parallel with the axis of the tire, and the width of the band is merely the thickness of the accumulated threads. Thus the band may be placed around a very large tire. When this is done, assuming that the circumference is as it will of course of necessity be somewhat less than the maximum circumferential length of the netting band, the operator will then spread the net around both sides of the tire. This tends to increase the effective opening width of each mesh in a direction parallel with the axis of the wheel and to decrease the length of each mesh measured along a tangent. As you pass around from the center of the tread portion of the wheel toward the rim, the change in shape of the individual meshes will be progressive and may go from a situation where on the tread the meshes are longer in a tangential than in an axial direction to a situation where down around the side of the tire the meshes are substantially square and further down near the rim, the meshes are longer in a radial than in a tangential direction.

It does not make any great difference how high up on the side of the tire away from the tread the net comes. It should preferably come at least half way down to the rim but if it comes further than that no harm is done and it can even extend not quite as far as half way down and still operate with satisfaction.

The point is that because of the inherent characteristic of the net with its knots fixed in position on the twine forming them, the net may be caused to fit snugly around the tire throughout a wide range of size and shape variation, the meshes compensating by change in the longitudinal as against the transverse dimensions between diametrically opposed corner knots in each mesh.

Referring to Figure 1 of the drawings, on the side of the tire, the diameter A—C will be greater than the diameter B—D of each mesh. At the periphery of the tire, the diameter D—B will be greater than A—C somewhere in between the diameters may equal. The relative difference between the diameters depend, of course, upon the relation between the size of the tire and the net encircling it. If the tire in Figure 1 were much greater in proportion to the diameter A—C of each mesh at the tread. If the device were smaller, the mesh diameter D—B would be much less than the diameter A—C on the side of the tread.

I claim:

1. A friction band for automobile tires and the like, including an endless, flexible, generally annular, fabric net band comprising a plurality of intersecting twines, knotted together at their points of intersection to form a series of meshes, annular separately adjustable holding cords, one threaded directly through the outermost series of meshes on each side of the net band, the knots joining the intersecting twines being of substantially greater bulk than the twines joining them.

2. A friction band for automobile tires and the like, including an endless, flexible, generally annular, fabric net band, comprising a plurality of intersecting twines, knotted together at their points of intersection to form a series of meshes, annular separately adjustable holding cords, one threaded directly through the outermost series of meshes on each side of the net band, the knots joining the intersecting twines being reinforced to have a bulk substantially greater than that resulting from the formation of the knot itself.

3. A friction band for automobile tires and the like, including a continuous, flexible, generally annular, fabric net band comprising a plurality of intersecting twines, knotted together at their points of intersection to form a series of meshes, annular separately adjustable holding cords, one threaded through the outermost series of meshes on each side of the net band, and metallic reinforcing plates associated with and enclosing some of the said knots.

4. A friction band for automobile tires and the like, including an endless, flexible, generally annular, open-meshed fabric band of netting, comprising a plurality of intersecting twines, knotted together at their points of intersection to form a series of widely open meshes, annular separately adjustable holding cords, one threaded through the meshes on each side of the net band, and metallic reinforcing plates associated with and enclosing some of the knots, said plates having corners bent inwardly between adjacent twines to enfold the knot.

5. A non-skid means for automobile tires and the like including an endless net band, comprising a series of intersecting twine elements joined at each intersection by a knot of greater thickness than the twine, a holding and adjusting cord on each side of the net threaded through each successive mesh on the opposed outer edges of the band and adapted to be drawn tight, one cord on each side of an automobile tire, self-locking manually releasable means for holding each cord in tight constricted position to constrain the net band to annular form about the tire.

6. An endless net band comprising a series of meshes made up of intersecting twines joined by spaced non-slip knots, the distance between any two knots along the twine joining them being the same as the distance between any other two knots in the band along the twine joining them, means adapted to draw the band tightly about the tread and sides of an automobile tire and the like, said means including separate cords threaded directly through opposed edges of the band and adapted to draw the edges of the band into a shape wherein the peripheral length of the opposed edges of band are less than the peripheral length of the tire about which the band is formed.

7. In an anti-skid device suitable for use on vehicle wheels of different diameters, an anti-skid member comprising an endless grommet of fabric netting, shaped to provide a plurality of rows of meshes, the members which form the meshes being knotted together, there being a row of meshes on each side of the grommet, said grommet adapted to be positioned about a wheel, and means for holding the grommet about the wheel and for drawing its sides a greater or less distance toward the center of the wheel, said holding and drawing means comprising a pair of holding cords, one positioned on each side of the grommet and each being engaged directly in the outermost row of meshes, and self-locking means mounted on said cords for holding them against accidental displacement in a variety of positions of adjustment.

LOTHAR A. EDERER.